United States Patent
Depta

(10) Patent No.: US 9,436,648 B2
(45) Date of Patent: Sep. 6, 2016

(54) METHOD FOR MATCHING THE SIGNAL TRANSMISSION BETWEEN TWO ELECTRONIC DEVICES, AND ARRANGEMENT HAVING A COMPUTER SYSTEM AND A PERIPHERAL DEVICE

(75) Inventor: Robert Depta, Augsburg (DE)

(73) Assignee: FUJITSU LIMITED, Kawasaki (JP)

( * ) Notice: Subject to any disclaimer, the term of this patent is extended or adjusted under 35 U.S.C. 154(b) by 633 days.

(21) Appl. No.: 13/883,029

(22) PCT Filed: Oct. 27, 2011

(86) PCT No.: PCT/EP2011/068893
§ 371 (c)(1),
(2), (4) Date: Jul. 9, 2013

(87) PCT Pub. No.: WO2012/062598
PCT Pub. Date: May 18, 2012

(65) Prior Publication Data
US 2013/0282940 A1    Oct. 24, 2013

(30) Foreign Application Priority Data
Nov. 8, 2010 (DE) .................. 10 2010 050 719

(51) Int. Cl.
*G06F 13/42* (2006.01)
(52) U.S. Cl.
CPC ......... *G06F 13/4291* (2013.01); *G06F 13/426* (2013.01); *H04B 2203/5425* (2013.01)
(58) Field of Classification Search
CPC .............. H04B 2203/5425; H04B 2203/5483; H04B 2203/5491
See application file for complete search history.

(56) References Cited

U.S. PATENT DOCUMENTS 7,319,384 B2 * 1/2008 Wakisaka ............... H04B 3/04
340/12.33
7,453,896 B1   11/2008 Bass
(Continued)

FOREIGN PATENT DOCUMENTS

JP   2004-140565   5/2004
JP   2005-311411   11/2005
(Continued)

OTHER PUBLICATIONS

English translation of Japanese Notification of Reasons for Refusal dated Sep. 9, 2014 from corresponding Japanese Patent Application No. 2013-537076.
(Continued)

*Primary Examiner* — Brian Misiura
(74) *Attorney, Agent, or Firm* — Fujitsu Patent Center

(57) ABSTRACT

A method of matching signal transmission between two electronic devices connected to one another with a physical interface and each have a transmitter and a receiver, wherein signals are transmitted from the transmitter of one device along a transmission link to the receiver of the other device and wherein the transmission link has at least two signal lines (+, −) for differential transmission of the signals including A) detecting signal values on the receiver of the first device separately for each of the two signal lines (+, −), B) evaluating a mismatch between the signals from the two signal lines (+, −) on the receiver of the first device on the basis of the detected signal values, and C) changing one or more parameters of the transmitter in the second device for at least one of the two signal lines (+, −), wherein at least A) and C) are performed iteratively until a predetermined termination criterion is satisfied.

17 Claims, 2 Drawing Sheets

(56) References Cited

U.S. PATENT DOCUMENTS

| | | | | |
|---|---|---|---|---|
| 7,650,526 | B2* | 1/2010 | Alon | G06F 1/10 713/400 |
| 7,949,056 | B2* | 5/2011 | Yamashita | H04B 3/30 375/229 |
| 8,917,783 | B2* | 12/2014 | Aryanfar | H04L 25/03878 375/257 |
| 2004/0131123 | A1* | 7/2004 | Maki | H04B 3/54 375/257 |
| 2005/0232412 | A1* | 10/2005 | Ichihara | H04B 3/30 379/414 |
| 2006/0181303 | A1 | 8/2006 | Dreps et al. | |
| 2010/0208780 | A1 | 8/2010 | Watanabe et al. | |

FOREIGN PATENT DOCUMENTS

| | | |
|---|---|---|
| JP | 2005-311412 | 11/2005 |
| JP | 2008-235993 | 10/2008 |
| WO | 2008/138926 A1 | 11/2008 |

OTHER PUBLICATIONS

National Semiconductor LVDS Owner's Manual—Fourth Edition, 2008, 2900 Semiconductor Drive, Santa Clara, CA 95051.

English translation of the Japanese Notification of Reasons for Rejection dated Jun. 2, 2015 from corresponding Japanese Patent Application No. 2013-537076.

* cited by examiner

METHOD FOR MATCHING THE SIGNAL TRANSMISSION BETWEEN TWO ELECTRONIC DEVICES, AND ARRANGEMENT HAVING A COMPUTER SYSTEM AND A PERIPHERAL DEVICE

TECHNICAL FIELD

This disclosure relates to a method of matching the signal transmission between two electronic devices connected to one another by a physical interface and each have a transmitter and a receiver, wherein signals are transmitted from the transmitter of one device along a transmission link to the receiver of the other device and wherein the transmission link has at least two signal lines for differential transmission of the signals.

The disclosure also relates to an arrangement having a computer system and a peripheral device, wherein the peripheral device connects to the computer system with a physical interface and wherein the computer system and the peripheral device each have a transmitter and a receiver for signal transmission between the computer system and the peripheral device.

BACKGROUND

In computer systems, two components or devices, for example, a motherboard and an internal hard disk or an external peripheral device, connect to one another by physical interfaces to be able to interchange data with one another. Popular interfaces are the Universal Serial Bus (USB), the Small Computer System Interface (SCSI), the Serial Attached SCSI (SAS), the Serial Advanced Technology Attachment (SATA) or the Fiber Channel (FC), for example. The transmission properties such as the transmission speed, the form and content of individual data packets or the addressing and communication among connected devices, are stipulated for each interface in an associated transmission protocol.

A physical interface comprises cables, electrical conductors and plug connections between the individual devices. The data and information are transmitted between the devices by analog signals. Signal transmission on the transmission link of the interface usually takes place on two differential signal lines. An analog signal is transmitted in unaltered form on one line ("+") and in inverted form on the other line ("−"). Finally, the two lines + and − form a transmission link. The signals are modulated in terms of their amplitude, for example, to encode digital information from individual bits. In the case of the + line, for example, a low level in the voltage corresponds to the logic value "0" and a high level in the voltage corresponds to the logic value "1". On account of the inversion of the − line, the converse case is obtained for the − line.

Differential transmission of a piece of information by signals on the lines + and − has the advantage that a difference signal based on "+"−"−" for the two signals can be formed. The voltage difference between the low level and the high level of the difference signal formed is therefore twice the magnitude of the single ended signal. Irradiated distortions can be largely eliminated which means that transmission certainty can be increased.

Each device has a transmitter and a receiver which send and receive analog signals via the interface in accordance with a protocol. In that case, the transmitters and receivers are specific circuits or integrated chips (ICs), and the transmitter and the receiver in a device are often described together as what is known as a "transceiver." The individual circuits of the transmitters and receivers are also called "transmitter-PHY" or "receiver-PHY" based on their task of physical signal transmission.

A physical interface with its transmission link comprising connectors, lines and conductor traces on boards influences the signal transmission between a transmitter and a receiver in two devices. The reason is that the transmission link is real and, hence, not ideal and has negative properties. On account of high-frequency scatter, electromagnetic interference, crosstalk or reflection (to name just a few negative properties), transmitted signals are altered and disturbed on the physical interface during transmission. By way of example, fluctuations in amplitude, phase (phase noise or jitter), frequency, slew rate or a combination of these effects arise for the transmitted signals.

In particular, a mismatch or imbalance may occur between the individual signals on the + and − lines if the transmission link has imbalances between the two + and − lines or negative effects arise with an imbalance in the + and − lines. The signals may thus also have an imbalance in terms of amplitude, phase, frequency, slew rate or a combination of these effects. This can result in impairment of the signal quality of the received signals (reduction of the horizontal and vertical eye opening in an eye diagram), in an increased bit error rate (BER) or in the worst case in loss of information.

Usually, properties of the transmitted transmission signals are asserted once on the basis of the transmission protocol used and are not changed again. Therefore, the parameters of a receiver are merely matched to the specification requirements on the basis of the prescribed transmission protocol. Matched parameters are stored in control registers in the receiver, for example. In the case of SAS technology, for example, matching can be performed during what is known as the "speed negotiation phase" (phase in which the transmission speed is determined) during a training phase. This receiver-end matching makes only a small contribution to improving the transmission properties, however.

US 2010/0208780 A1 discloses a signal transmission system, wherein data are transmitted differentially from a transmitter to a receiver. In the receiver, a DC component is ascertained from the differential signal and compared with a reference value. From this, a feedback signal is finally formed which is returned to the transmitter for the purpose of matching parameters in the transmitter. This solution allows only limited matching of the transmitter to disturbing effects within the transmission link.

It could therefore be helpful to provide a method and an arrangement of the type cited at the outset which allow improved matching of the signal transmission between two electronic devices.

SUMMARY

I provide a method of matching signal transmission between two electronic devices connected to one another with a physical interface and each have a transmitter and a receiver, wherein signals are transmitted from the transmitter of one device along a transmission link to the receiver of the other device and wherein the transmission link has at least two signal lines (+, −) for differential transmission of the signals, including A) detecting signal values on the receiver of the first device separately for each of the two signal lines (+, −), B) evaluating a mismatch between the signals from the two signal lines (+, −) on the receiver of the first device on the basis of the detected signal values, and C)

changing one or more parameters of the transmitter in the second device for at least one of the two signal lines (+, −), wherein at least A) and C) are performed iteratively until a predetermined termination criterion is satisfied.

I also provide an arrangement including a computer system and a peripheral device, wherein 1) the peripheral device connects to the computer system by a physical interface, 2) the computer system and the peripheral device each have a transmitter and a receiver that transmits signal between the computer system and the peripheral device, and 3) the arrangement is set up such that the transmitters of the computer system and the peripheral device are matched by the method.

Figure 1:
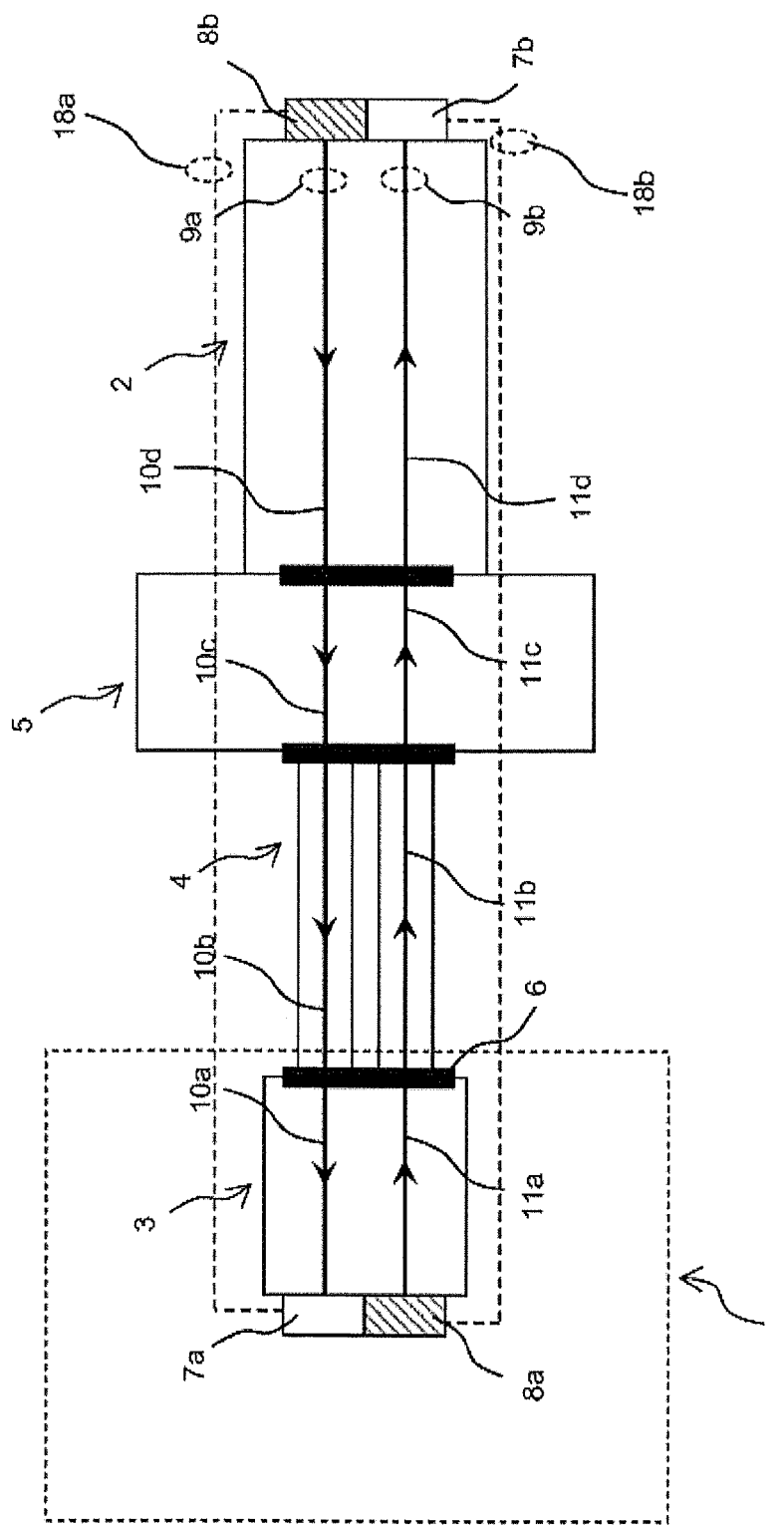
FIG. 1 shows a schematic illustration of an arrangement including a computer system with a peripheral device.

| List of Reference Symbols | |
| --- | --- |
| 1 | Computer system |
| 2 | Peripheral device |
| 3 | Host bus adapter |
| 4 | Cable |
| 5 | Backplane |
| 6 | Connector |
| 7a, 7b | Receiver |
| 8a, 8b | Transmitter |
| 9a, 9b | Transmission link |
| 10a, 10b, 10c, 10d | Subsections of the transmission link 9a |
| 11a, 11b, 11c, 11d | Subsections of the transmission link 9b |
| 12 | Register for signal values |
| 13 | Processing unit |
| 14 | Matching unit |
| 15 | Further register |
| 16 | Settings register |
| 17 | Sender PHY |
| 18a, 18b | Additional data line |
| +, − | Differential signal line |

DETAILED DESCRIPTION

I provide a method which may comprise:
A) Detection of signal values on the receiver of the first device separately for each of the two signal lines,
B) Evaluation of a mismatch between the signals from the two signal lines on the receiver of the first device on the basis of the detected signal values,
C) Changing of one or more parameters of the transmitter in the second device for at least one of the two signal lines, wherein at least steps A) and C) are performed iteratively until a predetermined termination criterion is satisfied.

Such a method takes account of a disequilibrium, mismatch or imbalance between the two signal lines. Measurements on the two signal lines detect and evaluate receiver-end imbalances between the signals from the two signal lines which can result in distortions. In a response thereto, parameters can be changed at the transmitter end separately and individually for the individual signal lines.

Hence, the method allows not just a general distortion in a transmission link as such, but also in fact imbalance between the signals on the two signal lines of the differential transmission link to be detected and taken into account in the design of the properties of the transmitter. This has the advantage that, besides the reception properties of a receiver, it is also possible to match the transmission properties of a transmitter such that signal transmission and quality can be improved.

An advantage of the method is that detection of signal values on the receiver of the first device separately for each of the two signal lines and changing of one or more parameters of the transmitter in the second device for at least one of the two signal lines can be performed iteratively. Hence, it is possible to generate a data record by numerous measurements of the signal values from the individual signal lines on the receiver of the first device on the basis of particular parameter values of the transmitter in the second device. A defined termination criterion may be a predetermined quantity of signal values, that is to say a particular magnitude of a result space, for example.

The raw data record obtained in this manner can then be used to ascertain the optimum for the parameter values that are to be set on the transmitter of the second device empirical-ly or by maximum/minimum calculation, averaging or by optimization algorithms, for example.

It is also possible for all three method steps A), B) and C) to be performed iteratively until a termination criterion is satisfied. For example, each time the signal values from the two signal lines have been measured, a mismatch in the signals would be evaluated on the receiver of the first device and then the parameters changed in the transmitter of the second device. This allows an optimum to be approached in steps. By way of example, a termination criterion would be the reaching of a predetermined close environment around the optimum. The advantage in this case is that it is possible to improve the compensation for the mismatch with every iteration so that sometimes fewer measurements or steps are necessary than in the case of the aforementioned approach of generating an empirical data record.

The detected signal values can be transmitted to the second device as a raw data record or as processed data, with the mismatch being evaluated in the second device. Alternatively, the mismatch is first evaluated in the receiver of the first device using the measured signal values, with the result of this evaluation then being transmitted to the second device.

Preferably, the parameters of the transmitter in the second device are matched such that properties of the signals from at least one of the two signal lines are altered by the transmitter in the second device, as a result of which the mismatch between the signals from the two signal lines can be reduced on the receiver. This means that, by way of example, transmission signals from only one signal line or from both signal lines can be consciously provided with and subjected to imbalances in the transmitter prior to transmission so that after the transmission the receiver has almost balanced signals available from both signal lines and it is possible to form the best possible received signal as a difference signal for the signals from the two signal lines.

Hence, it is possible to counter a mismatch detected at the receiver end in the two signal lines on account of unbalanced distortions in the transmission link by consciously and deliberately subjecting the transmission signals in the transmitter to imbalances having an opposite effect, with the result that ultimately it is possible to compensate for the imbalances which have an adverse effect in the transmission link. The properties of a received signal are improved thereby, particularly in the region of crosstalk and the horizontal and vertical eye opening. As a desired side effect, there may also be an improvement in the electromagnetic compatibility (EMC) of the whole system.

The properties of the signals altered at the transmitter end advantageously comprise at least signal amplitude, slew rate, pre-emphasis, phase shift and initiation time. In this case, the initiation time is intended to be understood to mean a conscious time delay for a differential signal component from one of the two signal lines, as a result of which it is possible to counteract a time shift in the signals which occurs in the transmission link by transmitting the signals on the two signal lines at staggered times. The phase shift and the initiation time are closely related signal properties. This means that a time shift can simultaneously accompany a phase difference in the signals. Conversely, both signals can be provided with a phase difference but sent simultaneously.

Alterations in the signal amplitude and/or in the slew rate of at least one signal on a signal line allow, in particular, unbalanced attenuation or power loss in the transmission link to be countered. Alterations in the pre-emphasis and/or de-emphasis of at least one signal on a signal line counteract unbalanced attenuation or accentuation of particular frequency components in the transmission link, in particular.

Examples of parameters in the transmitter that may be altered are the gain factor of a transmission amplifier (power amplifier) or characteristic values of impedance elements, particularly capacitances and inductances to set particular frequencies or set the slew rate of a signal, for example.

Preferably, the aforementioned method is performed for both devices. This means that it is possible to match not just the transmitter of the second device by detecting the mismatch in the transmission link of the physical interface, but also the transmitter of the first device. Hence, the parameters of both transmitters are matched in optimum fashion for the signal transmission along the interface.

Depending on configuration, the physical interface has lines for bidirectional signal transmission or unidirectional transmission paths. In the first case, the signals are transmitted in the form of voltage levels via differential signal lines in both directions from the transmitter of one device to the receiver of the other device. In the second case, differential signal lines are used just for signal transmission in one direction from the transmitter of one device to the receiver of the other device. Since the method is performed for both devices, it is accordingly possible to match both transmitters in optimum fashion to the respective transmission configurations of the physical interface.

Preferably, the method is performed after any change in the transmission link of the physical interface or at predetermined times, possibly periodically, for example, in predetermined training or tuning phases or when the whole system is started up. This means that the transmitters of the two devices can be reparameterized each time if imbalances in the transmission link of the physical interface can change. This is the case, for example, when cables or con-nectors having different high-frequency properties are used. A predetermined training or tuning phase could be speed matching between the two devices according to a protocol, for example.

The transmission of the data and/or results to the second device is preferably performed via a further data line (what is known as an "out-band interface"), which is separate from the signal lines. This has the advantage that transmission can be performed at the same time as the evaluation without burdening the actual transmission link and making evaluation of the signal values at the receiver end more difficult.

The measurement of the signal values of the signals from the two signal lines can be performed at the receiver end by external measuring devices, for example, an oscilloscope. By way of example, it is possible to measure common mode distortions, phase noise or horizontal and vertical eye openings.

However, it is also possible for signal values to be tapped off in automated fashion directly at the sampling point for the transmitted signals in the analog-to-digital converter of the receiver. A further option is to detect signal values inside what is known as the "unit interval" (UI), that is to say the time interval of a transmitted symbol.

Instead of directly evaluating a differential signal on the basis of the "+"–"–" calculation (for explanations, see above), it is also possible to detect the mismatch on the basis of the calculation ["+"+"–"]/2, for example. Further calculations, possibly with specific weightings for individual aspects of an imbalance in the differential transmission link, are possible.

Advantageously, particular signal patterns, possibly of different design for different transmission speeds, are used which are transmitted from the transmitter of one device to the receiver of the other device in a test or tune process. These signal patterns can then be evaluated on the receiver. The advantage of predetermined signal patterns is that a wide variety of scenarios can be thoroughly checked. In addition, it is possible to easily infer disturbances and imbalances in the transmission link by comparing the measured signal values with the predetermined signal patterns.

I also provide a computer system and a peripheral device of the type mentioned at the outset, wherein the arrangement is set up to perform a method of the aforementioned type. The peripheral device is a hard disk, for example.

My methods, arrangements, systems and devices are explained in more detail below with reference to the Drawings.

FIG. 1 shows a schematic illustration of an arrangement comprising a computer system 1 with a peripheral device 2. The two devices 1 and 2 connect to one another by a physical interface for the purpose of data interchange. In this case, the physical interface comprises cables 4 and a backplane 5 connected with connectors 6 both to one another and to a host bus adapter 3 in the computer system 1 and to the peripheral device 2. The host bus adapter 3 conditions peripheral bus signals from the physical interface and transmits these signals to a system-internal host bus or system bus (not shown), for example, a PCI (Peripheral Component Interconnect) bus, which is integrated on a main board of the computer system 1. By way of example, the peripheral device 2 may be an internal hard disk which connected to the main board of the computer system 1 by the backplane 5, the cables 4 and the host bus adapter 3 for the purpose of data interchange. However, it is also possible for the peripheral device to be an external device, for example, an external hard disk, a printer or a personal digital assistant (PDA).

For the purpose of data transmission, two unidirectional transmission links 9a and 9b are set up between the host bus adapter 3 of the computer system 1 and the peripheral device 2. By way of example, the physical interface is based on the SAS, SATA, FC or USB standard. Thus, the transmission links 9a and 9b each comprise two signal lines (not shown explicitly) which allow differential signal transmission. In this case, one signal line, for example, denoted by "+." carries a voltage signal for encoding the data. The other line, for example, denoted by "–," carries the inverted voltage signal. A receiver can form a difference voltage from the signals on the two signal lines + and – and therefore receives a robust and error-free and also low-noise received signal.

In addition, the host bus adapter 3 and the peripheral device 2 each have a transmitter 8a and 8b and a receiver 7a and 7b used to transmit signals. In this case, a data stream is routed from the transmitter 8b in the peripheral device 2 via the transmission link 9a to the receiver 7a in the host bus adapter 3 in the computer system 1. Conversely, a further data stream is routed in the other direction from the transmitter 8a in the host bus adapter 3 via the transmission link 9b to the receiver 7b in the peripheral device 2. The respective transmission directions for the transmission links 9a and 9b are denoted by arrows. The two transmitters 8a and 8b are shown in shaded form. The transmitters 8a and 8b and also the receivers 7a and 7b in the two devices 1 and 2 are PHY chips, that is to say electronic circuits or integrated chips for signal transmission between the two devices 1 and 2.

The transmission links 9a and 9b are constructed from a plurality of subsections 10a to 10d and 11a to 11d, respectively. Thus, subsections 10a, 10d and 11a, 11d are obtained on conductor tracks from boards in the host bus adapter 3 and in the peripheral device 2, subsections 10c and 11c are obtained on conductor tracks on the backplane 5 and subsections 10b and 11b are obtained in the lines of the cables 4. Each of these subsections 10a to 10d and 11a to 11d can disturb the signal transmission.

In addition, imbalances may arise between the differential signal lines + and − in the subsections 10a to 10d and 11a to 11d. These imbalances or mismatches mean that the signals on the receivers 7a or 7b are mismatched and unbalanced, particularly in relation to amplitude, phase, frequency, slew rate or a combination of these effects.

If a transmitter 8a or 8b now sends an analog signal via the transmission links 9a or 9b to a respective receiver 7a or 7b by applying voltage signals to the lines of the transmission links 9a or 9b on the basis of a prescribed transmission protocol, the individual subsections 10a to 10d and 11a to 11d of the transmission links 9a or 9b and particularly the imbalances between the two signal lines + and − in the subsections 10a to 10d and 11a to 11d influence the signals. These have their properties altered in an unbalanced manner or disturbed on their way from a transmitter 8a or 8b to the respective receiver 7a or 7b. This influencing of the signals can result in an increased error rate, a lower transmission speed or loss of information.

It is therefore desirable for the transmitters 8a and 8b to be matched in optimum fashion to the transmission links 9a and 9b so that properties of the transmitted signals, for example, the rise time or decay time of a signal edge, the pre-emphasis or de-emphasis and the relative initiation time, are altered as appropriate and optimized for signal transmission.

First, signal values are detected on the receiver 7a or 7b separately for each of the two signal lines + and −. Measurement of the signal values of the signals on the two signal lines + and − can be performed at the receiver end by external measuring devices, for example, an oscilloscope. However, it is also possible for signal values to be tapped off in automated fashion directly at the sampling point for the transmitted signals in the analog-to-digital converter of the receiver 7a or 7b. A further option is to detect signal values inside the unit interval (UI).

Next, the detected signal values can be transmitted to the other device 1 or 2 with the relevant transmitters 8a or 8b as a raw data record or as processed data. A mismatch between the two signals on the signal lines + and − can be evaluated in the other device 1 or 2. To this end, it is possible to use various calculations and evaluation options of the type explained above.

Alternatively, the mismatch is first of all evaluated using the measured signal values in the receiver 7a or 7b of the first device 1 or 2, the result of this evaluation then being transmitted to the second device 1 or 2.

Transmission of the data and/or results to the second device 1 or 2 is preferably performed via further data lines 18a or 18b separately from the signal lines. This has the advantage that transmission can be performed at the same time as the evaluation without burdening the actual transmission link and making evaluation of the signal values at the receiver end more difficult.

Finally, one or more parameters of the transmitter 8a or 8b in the second device 1 or 2 are changed for at least one of the two signal lines + or − on the basis of the evaluated mismatch. By changing and matching the parameters, it is possible to change settings for the signals on at least one signal line. This means that the signals are consciously subjected to an imbalance, with the result that balanced signals are available at the receiver end on account of the mismatched transmission along the transmission links 9a and 9b. Hence, an imbalance in the transmission links 9a and 9b is compensated for by a conscious and deliberate imbalance in the signals at the transmitter end.

Finally, iterative execution of the above steps allows an optimum to be attained for the matching of the parameters in the transmitter 8a or 8b. In this case, an optimum does not necessarily mean the best signal, but rather means a signal which is subject to an imbalance such that after the transmission along the transmission links 9a and 9b there are balanced signals available at the receiver end which meet the desired requirements in the best possible manner. By way of example, requirements may be placed on a reduction in the bit error probability or on improved electromagnetic compatibility for the transmission links 9a and 9b or on both.

It is possible to match the transmitter 8a of the host bus adapter 3 in the computer system 1 using the aforementioned methods first of all and then to parameterize the transmitter 8b of the peripheral device 2, or vice versa. It is also possible for the parameters of the respective receivers 7a and 7b also to be matched to the respective transmitted analog signals with their respective signal properties.

Furthermore, it is possible for the aforementioned method to be performed if there are properties of the physical interface such as altered shielding or an altered cable length. However, it is also possible for the method to be performed on a regular basis periodically at predetermined times, for example, after the computer system 1 is booted and the peripheral device 2 first responds.

Figure 2:
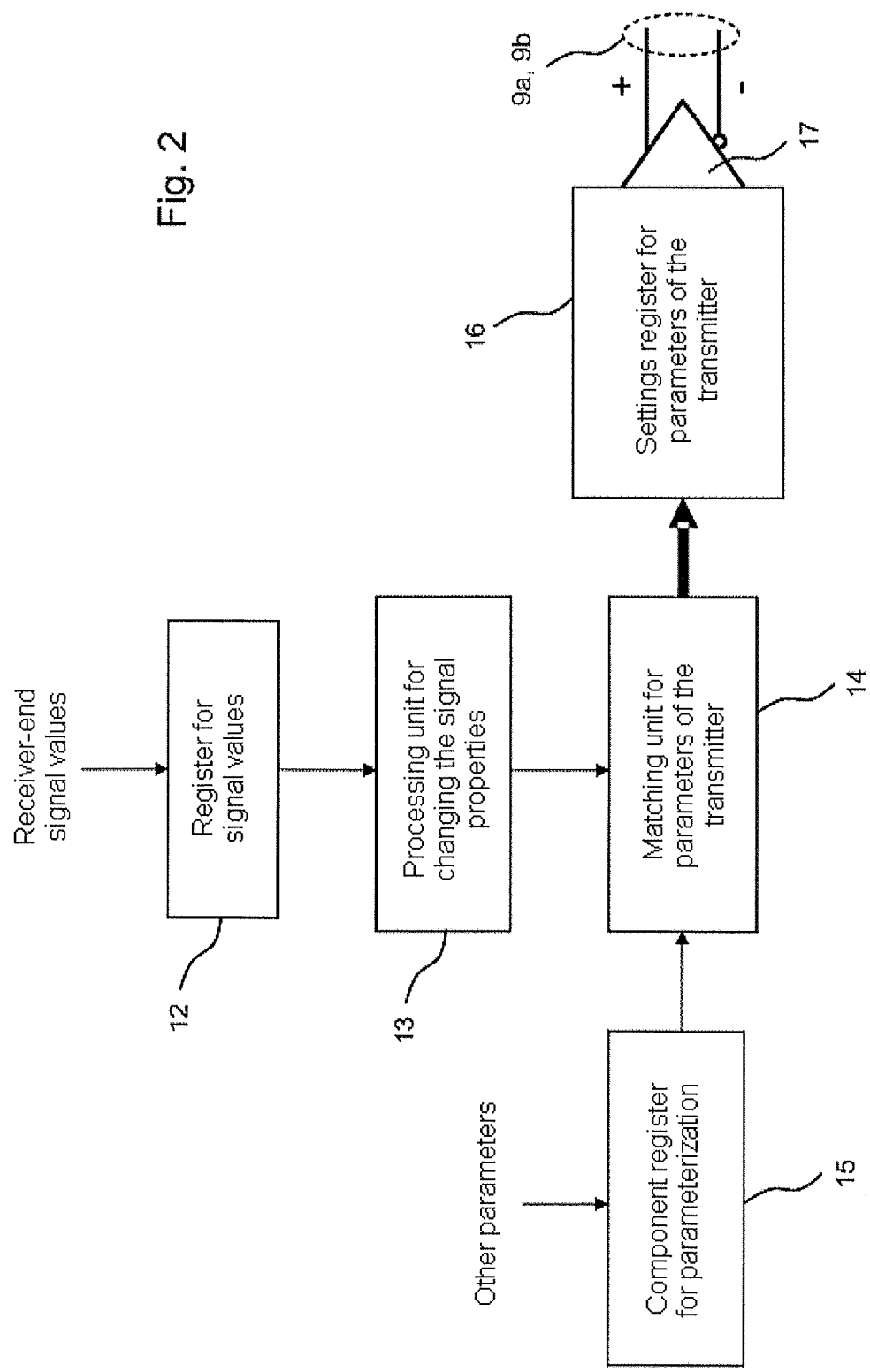
FIG. 2 shows a schematic illustration of individual components for matching the parameters of a transmitter.

FIG. 2 shows a schematic illustration of components and their logic combination for matching parameters of a transmitter 8a or 8b as shown in FIG. 1. Signal values from the two signal lines + and − which are detected and measured on the receivers 7a or 7b are first of all stored in a register 12. From this register 12, the signal values can be loaded into a processing unit 13 for the purpose of calculating changed signal properties. Finally, predetermined algorithms can be used by the processing unit 13 to calculate a mismatch or imbalance in the signals on the signal lines + and − at the receiver end from the individual signal values. From this mismatch, the processing unit 13 furthermore calculates changed settings for signals on at least one of the signal lines + and −.

These settings are finally transferred to a matching unit 14 which uses other parameters from a further register 15 to alter the parameters of the transmitter. By way of example, other parameters from the further register 15 may be further information based on the transmission protocol used or, by way of example, parameters for matching a respective receiver 7a or 7b to the relevant transmitter 8a or 8b as shown in FIG. 1, or may be obtained from external measurements.

The newly calculated and altered parameters of the transmitter are transferred to a settings register 16 coupled directly to the transmitter PHY chip 17. This means that the newly set parameters of the transmitter are available immediately for the next signal transmission. Signal transmission on the transmission links 9a or 9b is effected on two differential lines of a respective transmission link 9a or 9b in FIG. 2, which are denoted by + and −. An analog signal from a transmitter 8a or 8b as shown in FIG. 1, which transmitter has been parameterized as appropriate according to FIG. 2, is therefore transmitted in unaltered form on the + line and in inverted form on the − line. Finally, the two lines + and − shown in FIG. 2 form a transmission link 9a or 9b.

The matching of the parameters of a transmitter by individual processing steps in a plurality of registers 12, 13, 15 and in the logic units 14 and 16 can be implemented directly in a transmitter 8a or 8b or else in separate logic units in the computer system 1 or in the peripheral device 2 shown in FIG. 1.

In examples not shown, the physical interface between a computer system 1 and a peripheral device 2 may also be formed from a bidirectional transmission path. In this case, the transmitters 8a and 8b and the receivers 7a and 7b may each be connected in parallel with the single transmission link, as a result of which analog signals are transmitted via this transmission link either from the computer system 1 to the peripheral device 2 or from the peripheral device 2 to the computer system 1. Such a configuration is known from the USB standard, for example.

The invention claimed is:

1. A method of matching signal transmission between two electronic devices connected to one another with a physical interface and each have a transmitter and a receiver, wherein signals are transmitted from the transmitter of one device along a transmission link to the receiver of the other device and wherein the transmission link has at least two signal lines (+, −) for differential transmission of the signals, comprising:
    A) detecting signal values on the receiver of the first device separately for each of the two signal lines (+, −),
    B) evaluating a mismatch between the signals from the two signal lines (+, −) on the receiver of the first device on the basis of the detected signal values, and
    C) changing one or more parameters of the transmitter in the second device separately and individually for the two individual signal lines (+, −) such that the signals on at least one of the two signal lines (+, −) are affirmatively provided with and subjected to imbalances in the transmitter of the second device prior to transmission, whereby after the transmission balanced signals from the two signal lines (+, −) are available on the receiver of the first device, wherein A), B) and C) are performed iteratively until a predetermined termination criterion is satisfied.

2. The method according to claim 1, wherein the predetermined termination criterion is a predetermined quantity of signal values, a particular magnitude of a result space, or reaching a predetermined close environment around the optimum for a mismatch between the signals from the two signal lines (+, −).

3. The method according to claim 1, wherein the parameters of the transmitter in the second device are matched such that properties of the signals from at least one of the two signal lines (+, −) are altered by the transmitter in the second device, as a result of which the mismatch between the signals from the two signal lines (+, −) can be reduced on the receiver.

4. The method according to claim 3, wherein the properties of the signals comprise at least:
    signal amplitude,
    edge gradient,
    pre-emphasis,
    initiation time and
    phase shift.

5. The method according to claim 1, performed automatically.

6. The method according to claim 1, wherein the detected signal values are transmitted to the second device and the mismatch is evaluated in the second device.

7. The method according to claim 1, wherein the mismatch is evaluated in the receiver of the first device and a result of the evaluation is transmitted to the second device.

8. The method according to claim 6, wherein the transmission to the second device is performed via a further data line separately from the signal lines (+, −).

9. The method according to claim 1, wherein a processing unit in the second device detects the mismatch and stipulates changed properties of the signals.

10. The method according to claim 9, wherein a matching unit in the second device requests the stipulated properties of the signals from the processing unit and calculates changed parameters of the transmitter in the second device.

11. The method according to claim 10, wherein the calculated parameters are stored in the settings register in the second device, and the transmitter is matched for signal transmission by using the parameters from the settings register.

12. An arrangement comprising a computer system and a peripheral device, wherein 1) the peripheral device connects to the computer system by a physical interface, 2) the computer system and the peripheral device each have a transmitter and a receiver that transmits signals between the computer system and the peripheral device, and 3) the arrangement is set up such that the transmitters of the computer system and the peripheral device are matched by a method according to claim 1.

13. The arrangement according to claim 12, wherein the computer system has a host bus adapter to which the peripheral device is connected.

14. The arrangement according to claim 12, wherein the physical interface is designed on the basis of one of the following standards:
    SCSI,
    SAS,
    SATA,
    Fiber Channel,
    USB.

15. A method of matching signal transmission between two electronic devices connected to one another with a physical interface and each having a transmitter and a receiver, wherein signals are transmitted from the transmitter of one device along a transmission link to the receiver of the other device and wherein the transmission link has at least two signal lines (+, −) for differential transmission of the signals, comprising:
    A) detecting signal values on the receiver of the first device separately for each of the two signal lines (+, −), B) evaluating a mismatch between the signals from the two signal lines (+, −) on the receiver of the first device on the basis of the detected signal values, and C) changing one or more parameters of the transmitter in the second device for at least one of the two signal lines (+, −), wherein A), B) and C) are performed iteratively until a predetermined termination criterion is satisfied, the parameters of the transmitter in the second device are matched such that properties of the signals from at least one of the two signal lines (+, −) are altered by the transmitter in the second device as a result of which the mismatch between the signals from the two signal lines (+, −) can be reduced on the receiver, and the properties of the signals comprise at least:

signal amplitude, edge gradient, pre-emphasis, initiation time and phase shift.

16. A method of matching signal transmission between two electronic devices connected to one another with a physical interface and each having a transmitter and a receiver, wherein signals are transmitted from the transmitter of one device along a transmission link to the receiver of the other device and wherein the transmission link has at least two signal lines (+, −) for differential transmission of the signals, comprising:

A) detecting signal values on the receiver of the first device separately for each of the two signal lines (+, −), B) evaluating a mismatch between the signals from the two signal lines (+, −) on the receiver of the first device on the basis of the detected signal values, and C) changing one or more parameters of the transmitter in the second device for at least one of the two signal lines (+, −), wherein A), B) and C) are performed iteratively until a predetermined termination criterion is satisfied, a processing unit in the second device detects the mismatch and stipulates changed properties of the signals, and a matching unit in the second device requests the stipulated properties of the signals from the processing unit and calculates changed parameters of the transmitter in the second device.

17. The method according to claim 16, wherein the calculated parameters are stored in a settings register in the second device, and the transmitter is matched for signal transmission by using the parameters from the settings register.

* * * * *